United States Patent [19]
Gervais et al.

[11] 3,958,777
[45] May 25, 1976

[54] TAPE TRANSPORT REEL SERVOMECHANISM

[75] Inventors: William J. Gervais, Van Nuys; Jerry Matula, Culver City, both of Calif.

[73] Assignee: Pertec Corporation, El Segundo, Calif.

[22] Filed: Sept. 13, 1974

[21] Appl. No.: 505,861

[52] U.S. Cl. ................................. 242/182
[51] Int. Cl.² ............... G11B 15/58; G11B 23/12
[58] Field of Search ............ 242/182–184; 318/6, 7

[56] References Cited
UNITED STATES PATENTS

| | | | |
|---|---|---|---|
| 3,318,545 | 5/1967 | Tobey | 242/184 |
| 3,400,895 | 9/1968 | Cole et al. | 242/184 |
| 3,648,134 | 3/1972 | Audeh et al. | 318/6 |

*Primary Examiner*—Leonard D. Christian
*Attorney, Agent, or Firm*—Lindenberg, Freilich, Wasserman, Rosen & Fernandez

[57] ABSTRACT

A tape transport system having a capstan servomechanism for velocity control of tape across a read/write head and separate reel servomechanisms for tape supply and take-up control, and also having tape loops in vacuum columns, is provided with tape position feedback to each reel servomechanism to stabilize reel positions in a standby (zero capstan speed) condition from AC tachometers of the induction-generator type normally used during steady state (steady capstan speed) for velocity feedback.

14 Claims, 6 Drawing Figures

TAPE TRANSPORT REEL SERVOMECHANISM

BACKGROUND OF THE INVENTION

This invention relates to a tape transport system, and more particularly to individual servo-controlled reel motors for supplying and taking up tape in a tape transport system employing vacuum columns to maintain tension on the tape.

Tape transport systems for storage of binary or other data include a pair of reels and a capstan engaging the tape for moving it past a suitable transducer at a well regulated speed for reading and writing, and at higher speeds for searching or rewinding. As the tape transport stops and starts, sometimes with a reversal of direction, the capstan must accelerate and decelerate the tape rapidly in response to commands received from a data processor. To accomplish that it is common practice to provide loops of tape under tension on the supply and take-up sides of the capstan. These loops will then buffer the velocity differences between capstan and reels until reels are up to speed.

One widely employed technique used to tension the loops is to provide two vacuum chambers or columns one on each side of the capstan into which a loop of tape is drawn. A vacuum pump maintains a steady negative pressure in each column. The broad walls of each column are spaced apart by a dimension just slightly greater than the tape width to permit the loop to separate the negative pressure in the column from atmospheric pressure. Discrete loop position sensors spaced along the length of each column detect the position of the tape loop for the purpose of effecting an increase or decrease of reel velocity in order to maintain the loop in the column at a desired position. As a demand for tape is made by the capstan, such as while accelerating, the low-inertia tape loop in the column supplies the demand while the higher-inertia supply reel is being accelerated more slowly. On the take-up side of the capstan, the vacuum chamber pulls in tape being rapidly accelerated past the transducer by the capstan while the take-up reel is being accelerated more slowly.

During steady-state drive operation, such as while searching, the loops in the two columns will be maintained at a predetermined position in each column by independent reel servomechanisms in response to the loop position sensors as just described. Depending on the particular reel servo design, each reel servomechanism may or may not be provided with a tape velocity signal from a tachometer located between the vacuum chamber and the reel.

The problem with maintaining low-inertia loop positions through reel servomechanisms employing a tachometer, or other tape velocity sensing means, is that during standby conditions (no capstan velocity), both tape and reel velocity is virtually zero. With no velocity feedback signal, a given reel may slowly drift in position, thus increasing or decreasing the low-inertia loop between that reel and the capstan, at least until a position sensor or other type of loop position sensing means in the column detects a change in the loop position. The reel servomechanism may then overcorrect, and the result could be continuous movement of the tape loop about some sensing point. A continuous or linear loop position sensing means under some circumstances could overcome this problem, but to provide such a continuous position sensing means may not be the most desirable solution because of other problems and/or costs associated with this means.

For a 10½ inch diameter tape reel, the torque produced on the reel by the vacuum system varies with the tape pack radius by a ratio of 2 to 1 (for example from 40 oz-in when the reel is full of tape to 20 oz-in when the reel is empty). Assuming frictionless motors and tape path, the only force opposing the vacuum system is the reel motor torque. It is difficult to generate a torque which will prevent reel drift over the full range between a full and an empty reel. Consequently if adjusted with a full reel, the servo may drift when the reel is empty and when adjusted with an empty reel the servo may drift when the reel is full.

Motor and tape path friction will alleviate the problem to a limited extent. However motor friction is known to vary as conditions change, such as when the motor temperatures vary during operation, and as the brushes wear. Tape path friction also changes with various conditions and is difficult to predict. Moreover, the required bias torque which depends principally on armature circuit resistance is a variable quantity in the standby condition and cannot be reliably predicted. Current feedback could be used to decrease torque variation, but introducing current feedback may greatly impair the motor effectiveness. What is desirable is a method of stabilizing the tape reels while the capstan is not being driven to maintain the positions of tape loops in the vacuum columns as well as providing velocity information when the capstan and reels are moving.

SUMMARY OF THE INVENTION

In accordance with the present invention, tape position feedback is provided in each independent reel servomechanism to stabilize the tape loop between each tape reel and a capstan employed to drive the tape past a suitable transducer. Each reel servomechanism is also provided with a tape velocity feedback signal derived during steady-state drive conditions from a low-inertia tachometer driven by the tape via a pulley positioned between the reel and vacuum column. During standby conditions, when the capstan velocity is zero, a tape position feedback signal is derived from a tape position sensing means placed between the reel and the column. Any change in position of the tape causes the reel to be driven in a corrective direction to return the tape loop between the reel and the capstan to its original standby position.

In accordance with a further feature of the invention, the tape position sensing means is provided in the form of an angular position sensor having a rotor connected to the pulley of the tape velocity tachometer and a stator comprised of an AC excited primary winding and a secondary (output) winding. As still another feature of the invention, the tape velocity tachometer is of the AC induction-generator type and is used as the tape position sensing means, while the tape velocity is virtually zero. By connecting through a switch and a rectifier, the secondary winding of the stator provides position feedback to a summing junction at the input of a power amplifier for the reel servomechanism. The switch is opened while the capstan is being driven, thereby holding the position feedback signal at zero except during standby operations.

The novel features that are considered characteristic of this invention are set forth with particularity in the appended claims. The invention will best be understood from the description when read in connection with the accompanying drawings.

DESCRIPTION OF THE PREFERRED EMBODIMENTS

Figure 1:
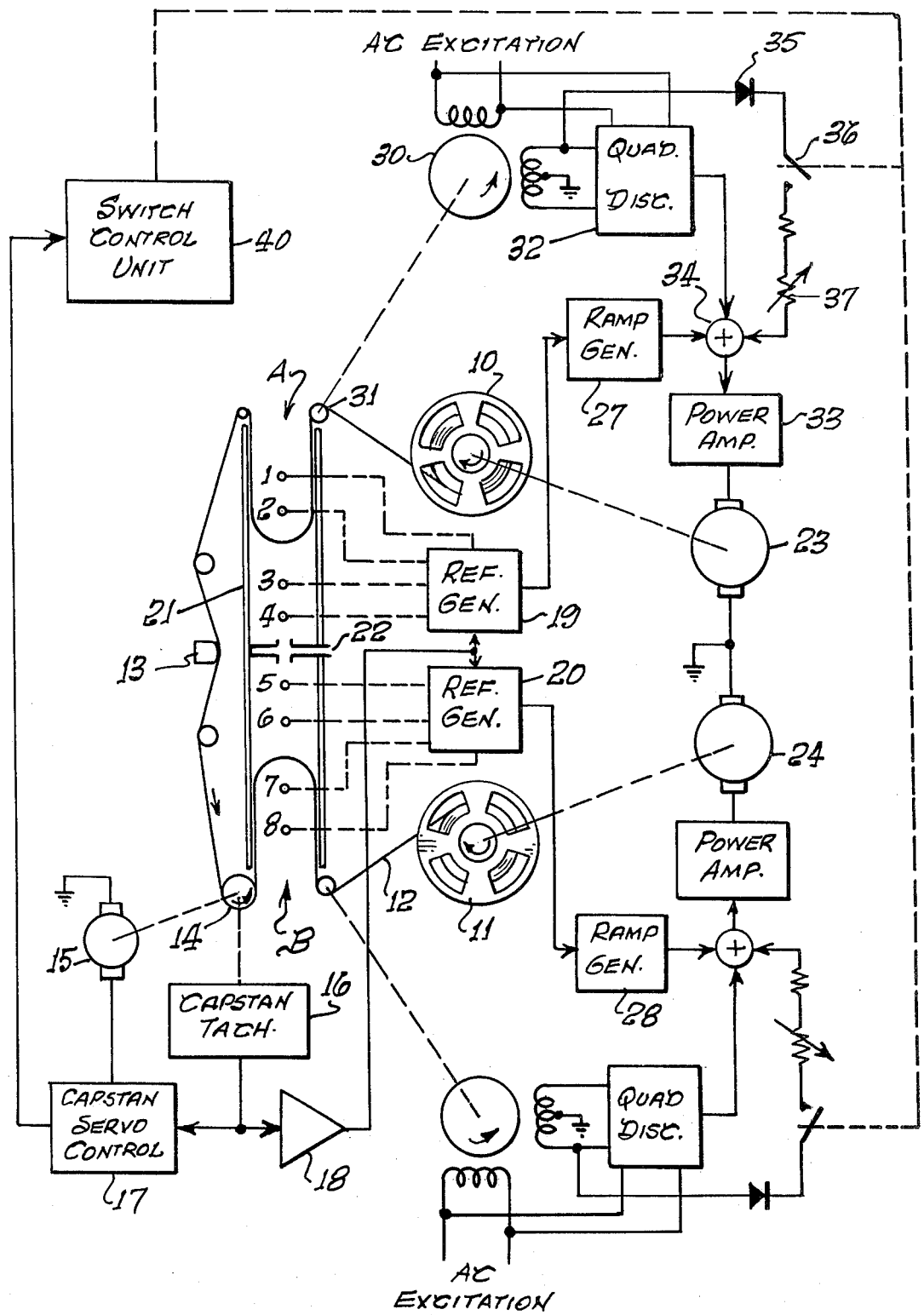
FIG. 1 is a block diagram of a tape transport mechanism embodying the present invention.

Referring now to FIG. 1, a tape transport mechanism embodying the present invention includes a pair of reels 10 and 11 upon which magnetic tape 12 is wound and between which tape is transported past a suitable transducer (read/write head) 13 as tape is wound from one to the other, such as from the reel 10 to the reel 11. The tape is driven at controlled speeds past the transducer 13 by a capstan 14. A low-inertia motor 15 is employed to drive the capstan. A capstan tachometer 16 produces a tape velocity feedback signal which is employed in a capstan servo control unit 17 to stabilize the capstan motor at a desired velocity in a conventional manner. The tape velocity signal from the capstan tachometer is also applied through an isolating amplifier 18 to reference generators 19 and 20 for reference signals proportional to the velocity of tape going past the capstan 14. During standby, when the capstan is still, the reference generators simply provide reference (bias) signals for the reel servomechanisms suitable for maintaining the tape loops in the columns within predetermined boundaries, as will be described more fully hereinafter.

The reels 10 and 11 are rigidly mounted relative to vacuum columns A and B schematically illustrated as an H-shaped structure 21. A vacuum source (not shown) is connected through a passage 22 to the innermost points of the vacuum columns. The capstan velocity signal coupled to the tape reel servomechanisms for the reel motors 23 and 24 through reference generators 19 and 20 is separately modified with respect to gain in each reference generator in order to cause the tape reels to be so driven as to permit loops of tape to be drawn into the columns to desired positions. These loops are commonly referred to as low-inertia tape loops because, upon accelerating the tape past the transducer 13, the capstan is able to increase tape velocity rapidly by drawing tape from one loop, and temporarily storing tape in the other loop, while the higher-inertia tape reels are brought up to speed more slowly by their respective motors. For example, if the capstan is driven in the direction indicated to transfer tape from the reel 10 to the reel 11, tape across the transducer 13 is brought up to the proper velocity for recording rapidly by taking tape from the loop in vacuum column A and depositing tape into vacuum column B while the reels 10 and 11 are being accelerated.

It is evident that until the reels are rotating at full speed in the direction shown, the loop positions will be changing in the columns. On the supply side (column A), the loop position will move toward the opening of the column while on the take-up side (column B) the loop position will move further into the column because the loops are supplying and taking up tape. Each column is provided with four loop position sensors, such as a sensor −1 in column A. If the sensors are numbered 1 through 8, the relationship of the sensors to the reference generators 19 and 20 is to maintain the loops between sensors 2 and 3, on the supply side and between sensors 6 and 7 on the take-up side (the midzones) during standby conditions and to maintain the loops at some other predetermined positions or within predetermined zones when not in standby (i.e., capstan operating). While the loops are in the midzones, and when the capstan is stopped, the reference generators provide no output signals to ramp generators 27 and 28.

During acceleration in a given direction, or operation at a constant capstan velocity, such as in the direction shown, the loops will cross sensor 2 in the supply side and sensor 6 in the take-up side. That will cause the reference generators 19 and 20 to supply a reference signal to the ramp generators 27 and 28 that is some percentage (e.g. 90 percent) of the tape speed signal from the capstan tachometer to cause the motors 23 and 24 to increase speed in the forward (clockwise) direction. As long as the tape is in between the sensors 1 and 2 on supply side and 5 and 6 on take-up side, the signal derived from the capstan through ramp generators 27 and 28, respectively, causes the tape reels to run slower than the capstan by 10 (100–90 percent). Consequently, the tape loops will continue to move and finally reach sensors 1 and 5. The arrangement is symmetrical for operation of the capstan in the opposite direction.

When the loops pass over the sensors 1 and 5, the reference generator increases the reference signal to the associated ramp generator to more than 100 percent of the tape speed signal from the capstan tachometer, such as to 110 percent. That will cause more power to be applied to further increase the speed of the respective reel motors thus causing the tape loops beyond sensors 1 and 5 to reverse direction and again cross their respective sensors moving back into the 90 percent speed zone. In this way, the loop position during capstan's steady forward speed is maintained about sensors 1 and 5. In the reverse capstan direction the loops are maintained about sensor 4 and 8 respectively. More sensors could be provided for a larger number of smaller control stetps for higher performance requirements. Moreover fewer sensors for larger control steps could be provided for low performance requirements. A preferred embodiment for the reference and ramp generators will be described hereinafter with reference to FIG. 4, but first the description of FIG. 1 will be completed.

Once the reels 10 and 11 have been brought up to speed in a controlled manner by the ramp signals which increase at a predetermined rate, the low-inertia tape loops are maintained about the extreme sensors 1 and 5 of the vacuum columns by the reel servomechanisms. Both supply and take-up servomechanisms are the same in organization and operation. Consequently, only the servomechanism for the upper reel motor 23 (the supply motor for forward tape drive) will be described. It consists of an AC excited tachometer 30 driven by the tape via a pulley 31, a quadrature discriminator 32, and a power amplifier 33.

The input of the power amplifier is connected to a summing junction 34 to sum a tape velocity feedback signal and the ramp signal derived from the reference signal, which in turn are respectively derived from the tape velocity signal from the capstan tachometer and from the loop position sensors. That capstan velocity signal is distinct from the velocity feedback signal derived from the tachometer 30 because of the high inertia of the tape reel as compared to the low inertia of the tape loop that supplies or takes up tape while the capstan is accelerated or decelerated.

During steady state forward drive operations, the signal from the ramp generator 27 varies between 90 percent and 110 percent of the capstan reference signal depending upon which side of the extreme loop sensor 1 the tape loop resides on, so that the tape velocity signal from the tachometer 30 (via the quadrature discriminator 32) stabilizes the tape speed over the pulley 31 at an average speed equal to the speed of tape around the capstan. Any capstan program that causes the tape loop to rise or fall in the column will cause the reference generator to switch from 0 to 90 to 110 percent of the capstan tape velocity signal. The ramp generator 27 is used to prevent a step change from being introduced into the reel servomechanism, and will instead cause a steady rate of change in the reel servomechanism velocity reference in the proper direction to restore the tape loop to the desired position.

During standby conditions, the speed of the capstan 14 is zero and the speed of the pulley 31 is also zero. With the ramp signal from the generator 27 zero at this time, there is no feedback for the reel motor except through a rectifier 35 and switch 36 which is closed during the standby condition, i.e. when the capstan is at rest, by a switch control unit 40. The tachometer 30 then provides a position feedback signal to the reel motor. If a segment of tape tends to move at the pulley 31, the rotor of the tachometer 30 will be turned through a very small angle to produce a corrective position feedback signal that will drive the rotor 30 back to a null position. The restoring drive is from the motor 23 to the reel 10 then through the tape to the pulley 31.

From the foregoing it is evident that the tachometer 30 and the quadrature discriminator 32 comprise means for producing a feedback signal proportional to tape velocity between the column and the reel, and that the tachometer 30, the rectifier 35 and the switch 36 comprise means for producing a feedback signal proportional to tape position between the column and the reel. If the tape moves between the column and the reel while the switch 36 is closed, a position feedback signal is applied to the summing junction 34. Velocity feedback is virtually zero at that time, as noted hereinbefore. When not in standby, the switch 36 may be open to make the position feedback signal zero, although this is not necessary, only preferable. In either case, a potentiometer 37 permits adjusting the gain of the position feedback signal for optimum standby stability. It is also not necessary for the tachometer, used to provide a tape velocity signal, to be also used to provide a tape position feedback. A separate tachometer could be employed for velocity, but it is preferred to share one device to minimize components. A suitable tachometer that will serve both purposes is one of the AC induction — generator type described in *Control Engineer's Handbook*, McGraw Hill (1969), by Truxal in Section 12.39.

Although switch 36 has been schematically illustrated as a single pole, single throw mechanical switch, it should be recognized that an electronic switch, such as a field-effect transistor, could be readily substituted. In any event the switch 36 is responsive to a binary signal received by the control unit 40 indicative of capstan motion, i.e. indicative of whether or not the tape is being driven by the capstan.

Figure 2:
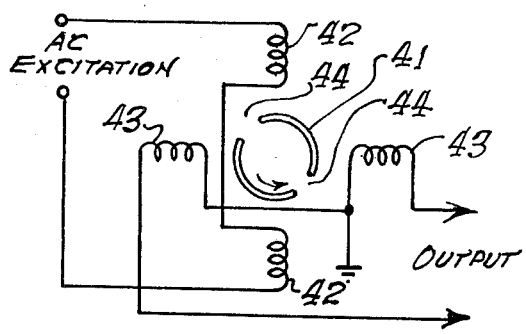
FIG. 2 is a schematic diagram of a combined tape position and velocity transducer employed in each of the supply and take-up reel servomechanisms.

Referring now to FIG. 2, there is illustrated schematically an AC induction-generator tachometer comprised of a metal cup rotor 41, and a stator having an AC excited primary winding 42 and a center tapped secondary winding 43. This type of AC tachometer is excited with one phase of an AC signal, such as a square wave signal at 800 Hz. The signal induced across the secondary is proportional in amplitude to the speed of rotation of the rotor. Through quadrature discrimination, a DC signal proportional to speed of rotation is readily obtained.

Figure 3:
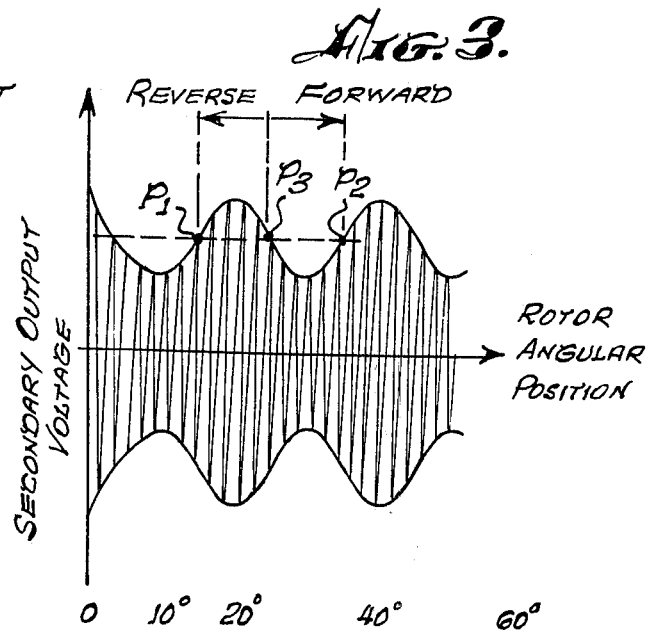
FIG. 3 is a diagram illustrating the output of the position transducer of FIG. 2 as a function of angular shaft position.

Truxail, supra, notes that at zero speed, there is a residual voltage resulting from rotor dissymmetry that varies with rotor angular position. As the rotor turns through a sector between adjacent poles of the stator, the coupling between the primary winding and the secondary winding varies sinusoidally. For example, assuming a stator having 18 poles, as the rotor turns through 20°, the coupling will vary from a maximum to a minimum (at 10°) and 20° of rotation, the amplitude of the signal induced across the secondary winding is proportional to the angular displacement of the rotor. Upon rectifying the output of the secondary winding there is provided a position feedback signal for stabilizing the rotor at, for example, an angular position of 15° by adjusting the gain of the feedback signal relative to a bias level (represented by a dotted line in FIG. 3) such that the reel servomechanism nulls at a position $P_1$.

A null will be reached at successive angular positions displaced by 20°, such as at position $P_2$. Between positions $P_1$ and $P_2$, the feedback signal will increase to a maximum of the proper corrective polarity, which is a polarity that will drive the rotor back to position $P_1$. From the maximum, the feedback signal will decrease to a minimum at position $P_3$. However, that null position is not stable because any change in rotor position will produce a feedback signal that drives the rotor forward to the null position $P_3$. The sense of the feedback could, of course be reversed to stabilize at position $P_3$ instead, but the result is the same, namely that the rotor will stabilize at the next static position as it is driven forward or backward.

This ability to derive a position feedback signal from a velocity feedback tachometer is due to any dissymmetry in the rotor. Such a zero speed output has heretofore been regarded as a type of error (see Truxal, supra.) In this system, that type of error is used to advantage and should therefore be enhanced. One source of dissymmetry in the rotor is nonuniformity of the cup caused by irregular machining. To enhance that, one or two dismetrically opposite slots may be machined on the rotor cup. Two slots 44 are shown in FIG. 2. However, such slots are not absolutely necessary since virtually every rotor cup in tachometers of this type have some inherent dissymmetry so that it would be possible to select from commercially available tachometers those having the most inherent zero speed output for this application.

Figure 4:
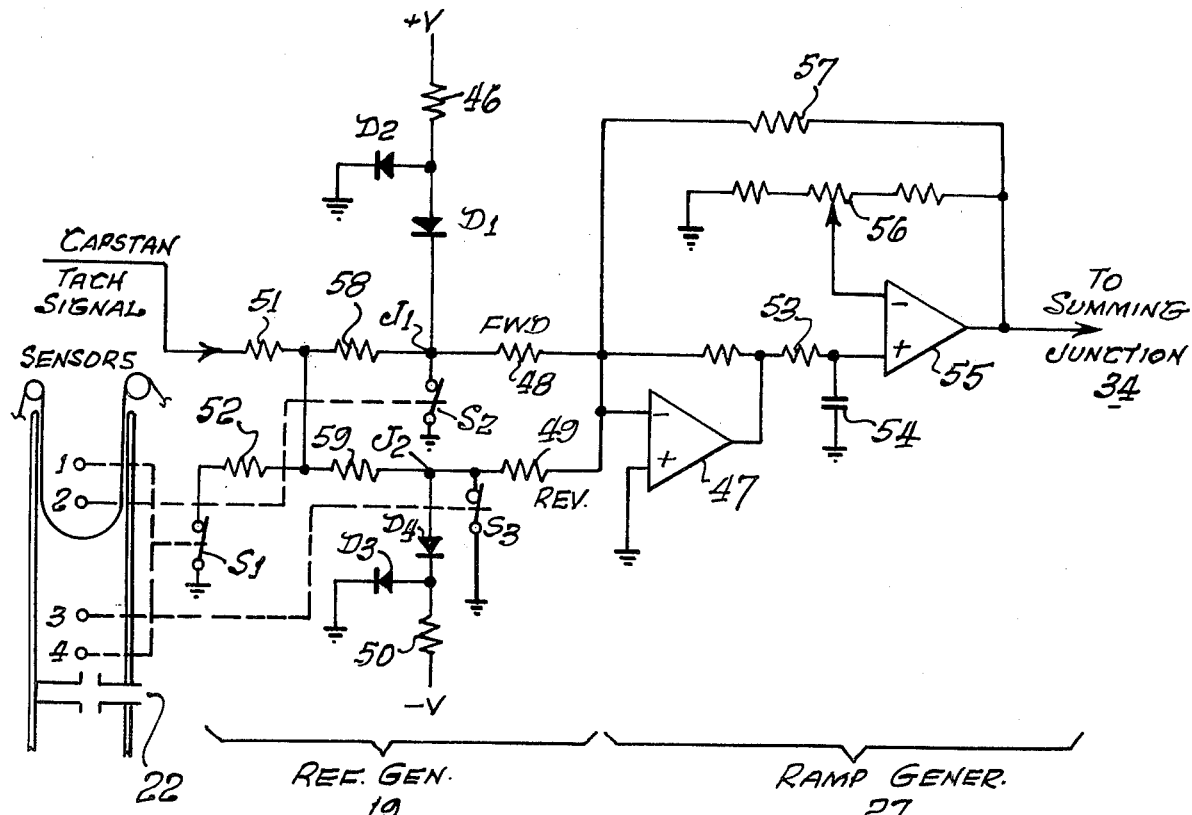
FIG. 4 is a circuit diagram of reference and ramp generators employed in the supply and take-up reel servomechanisms of the system illustrated in FIG. 1.

The reference generator 19 and ramp generator 27 for the servomechanism that controls the reel 10 will now be described with reference to FIG. 4. The reference and ramp generators for the servomechanism driving reel 11 is similar and will not be described. The capstan tachometer signal is coupled by the reference generator to the ramp generator with a gain of 0, 0.90 or 1.10. This signal is zero when the capstan is standing still, so there is no contribution from the capstan tachometer to the feedback signal applied to the power amplifier through the summing junction 34. The reference and ramp generators are effective only when the capstan is being driven.

Assuming the tape transport system is in the standby condition, the capstan tachometer signal from the isolation amplifier 18 (FIG. 1) is zero. If the tape loop in the column A is between sensors 2 and 3, the switches $S_1$ through $S_3$ shown in FIG. 4 are all closed as shown. Consequently the input to the ramp generator is grounded and the output is zero. Now if for some reason an outside force moves the loop above the vacuum sensor 2, with the capstan tachometer signal still zero, the output of the ramp generator would be zero, even with switch $S_2$ open in response to operation of the sensor 2, because the input to the reference generator 19 is zero. In order to restore the tape loop to the zone between sensors 2 and 3, a biasing network comprised of diodes $D_1$ and $D_2$, and a resistor 46 connected to a positive voltage source (+V) provides some small positive current to the input of a summing amplifier 47 through a resistor 48. This effectively substitutes for a capstan tachometer signal during a standby condition and restores the tape loop to the zone between the sensors 2 and 3. Similarly, if some outside force moves the loop below the vacuum sensor 3 during a standby condition, switch $S_3$ is opened to provide some small negative current to the input of the summing amplifier 47 through a resistor 49 from a biasing network comprised of diodes $D_3$ and $D_4$, and a resistor 50 connected to a negative voltage source (−V). Once the tape loop has been restored to the zone between sensors 2 and 3, switches $S_1$, $S_2$ will be closed and the input to the amplifier 47 is thus returned to zero. A position feedback signal applied to the summing junction 34 via switch 36 (FIG. 1), which is in the closed position during standby, maintains the loop position substantially steady.

Upon putting the tape transport system in the "run forward" mode, the tape loop will rise in column A because of the relatively high inertia of the reel 10. The sensor 2 will detect when the loop is above it and open the switch $S_2$. The sensors 1 and 2 are sensitive to a change from a positive (atmospheric) pressure to a negative (vacuum) pressure, while the sensors 3 and 4 are sensitive to a change from negative to positive pressure, (atmospheric). Once the switch $S_2$ is open, the capstan tachometer signal appears at the input of the summing amplifier 47 FIG. 4. The polarity of that signal is selected to be positive for forward run of tape in the direction indicated in FIG. 1. Consequently, with the switch $S_2$ open, positive current appears at the input of the summing amplifier 47, which is the input stage of the ramp generator 27.

The positive capstan tachometer signal at a junction between the resistor 48 and diode $D_1$ is much higher than the bias voltage which appears across the diode $D_2$. Consequently, the diode $D_1$ is back biased to isolate the bias circuit from the capstan tachometer signal while the capstan is running. This makes the output of the ramp generator directly proportional to just the capstan speed, without being increased by a constant amount of bias current which would decrease the linearity of the ramp generator output.

In the present exemplary embodiment, the input to the amplifier 47 is predetermined by a voltage dividing network comprised of resistors 51, 52, 58, 59 and 48 to be 90 percent of the capstan tachometer signal with only switch $S_2$ open. The output of the amplifier 47 is coupled by a resistor 53 to an integrating capacitor 54 connected to the noninverting input terminal of an operational amplifier 55 that amplifies the difference between it and a voltage set by a potentiometer 56. That potentiometer is set to yield a desired slope in the ramp output of the amplifier 55. A fixed feedback resistor 57 stabilizes the ramp signal. The ramp signal thus generated is applied to the summing junction 34 (FIG. 1) to provide a forward drive input signal to the reel servomechanism. That accelerates the reel motor to 90 percent of the capstan speed.

As the reel motor accelerates to 90 percent of the capstan speed, the low-inertia loop continues to rise to and passes sensor 1. At that time the switch $S_1$ is opened to remove the voltage dividing resistor 52 from the circuit. This increases the signal at the input of the amplifier 47 to 110 percent of the capstan tachometer signal to accelerate the reel motor to a higher speed. The loop then reverses direction and starts back toward the sensor 1. As the loop drops below the sensor the switch $S_1$ closes and the ramp generator begins ramping toward 90 percent of the reference speed. This process then continually repeats itself. As long as the capstan rotates at a continuous velocity the tape loop gently oscillates about the sensor 1.

When the capstan motor is suddenly stopped, the relatively high inertia of the reel 10 will feed tape into the column A, causing the low-inertia tape loop to drop below sensor 2. Under this condition all switches are closed and the ramp generator output begins ramping toward zero. The reel 10 comes to rest with the tape loop located between sensors 2 and 3. In this midzone, all switches will remain closed and the reel servomechanism will then maintain the position of the loop as noted hereinbefore.

While operating the reel 10 in the opposite direction to take up tape, the operation of the reference and ramp generators is the same except that the tape loop is maintained about the sensor 4. The direction of rotation is controlled by means not shown which reverses the polarity of the voltage out to the motor from the power amplifier.

The use of reference generators to provide input signals to the reel servomechanisms proportional to capstan tachometer velocity, i.e., proportional to tape velocity, is in the prior art. What is new as an improvement over the prior art is the use of reference generators in conjunction with ramp generators. The ramp generators modify the reference signals in a way to minimize the difference in start and stop time for empty or full reels. The ramp generators act as integrators during the time the capstan is programmed to accelerate from zero to a predetermined speed, or from the predetermined speed to zero. In so doing, the ramp generators produce certain average signals which make it possible to run the reels with smaller motors, and also make it possible to use shorter vacuum chambers for a given motor size.

Figure 5:
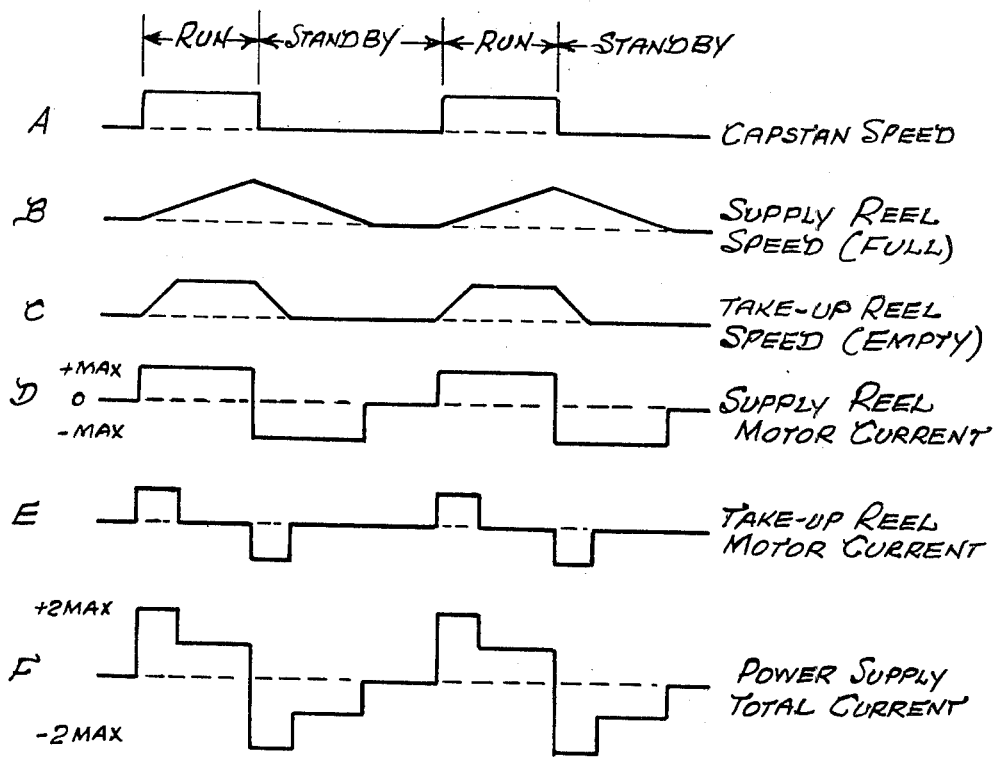
FIGS. 5 and 6 illustrate diagrams useful for understanding and comparing the operation of reel servomechanisms in a tape transport system without and with ramp generators, respectively.
Figure 6:
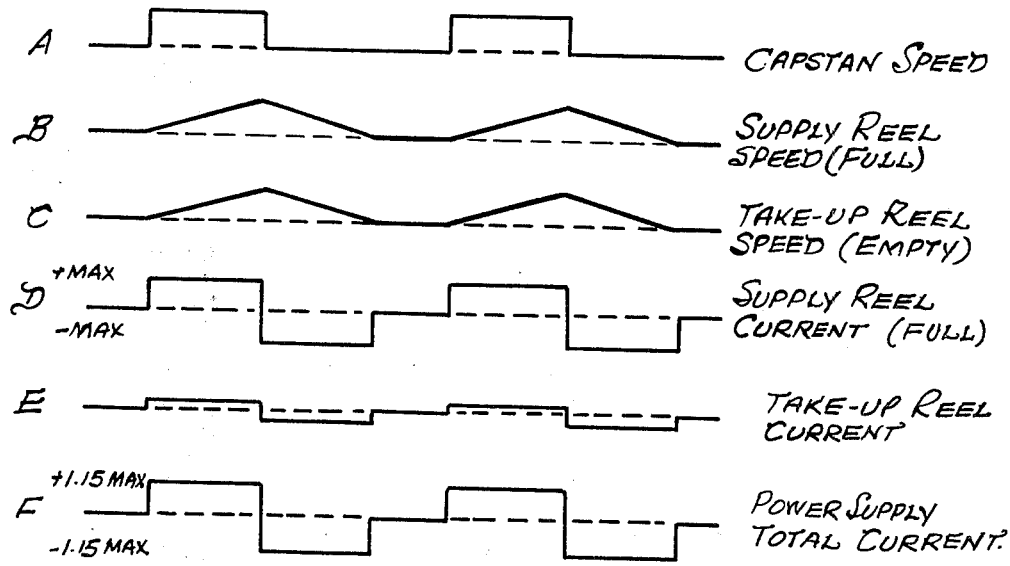

Another advantage is that the DC power supply required need not have as great a current capacity due to the predictable behavior of the high gain servomechanism which follows the ramp generator output. To fully appreciate this advantage, diagrams of FIG. 5 for a system operating without ramp generators (e.g. see U.S. Pat. No. 3,319,901) are to be compared with diagrams of FIG. 6 for a system operating with ramp genrators 27 and 28 in accordance with the present invention. Diagram A of FIG. 5 represents capstan speed during alternate periods of "run" and standby. Diagrams B and C represent the speeds of the respective full supply and empty take-up reels. Diagrams D and E represent current of respective supply and take-up reel motors. Diagram F is then the composite of the currents to both motors which the power supply provides. The diagrams A through F of FIG. 6 correspond to the diagrams A through F of FIG. 5, but with ramp generators. Note from diagram C that the take-up reel tracks the supply reel. Because it is assumed that the take-up reel is empty, the take-up reel current is significantly reduced (but, of course, maintained for a longer period). As a consequence, the peak power demand made in the power supply is reduced as compared to a system of the type whose operation is depicted in FIG. 5.

Although particular embodiments of the invention have been described and illustrated herein, it is recognized that modifications and equivalents may readily occur to those skilled in the art and consequently it is intended that the claims be interpreted to cover such modification and equivalents.

The embodiments of the invention in which an exclusive property or privilege is claimed are defined as follows:

1. In a tape transport system including a capstan for moving tape past a work station from a supply to a take-up reel and wherein means are provided for forming loops between said capstan and each of said reels, a separate servo system coupled to each of said reels, each servo system comprising:
   a drive motor coupled to said reel;
   motor control means including a summing junction for producing a drive motor control signal;
   means including a pulley engaging said tape between said loop forming means and said reel for producing a position signal proportional to the magnitude of tape movement thereat;
   means for sensing when said capstan is at rest; and
   means responsive to said capstan being at rest for applying said position signal to said summing junction.

2. In a tape transport system having a capstan and servomechanism for velocity control of tape across a work station, separate reels and servomechanisms for tape supply and take-up control, and a separate tape loop between each reel and said capstan, a separate combination for each reel and tape loop comprising:
   means for storing said separate tape loops, each independent of the other; separate means between each tape loop and a different one of said reels for producing a signal proportional to any change in position of a segment of tape at the entrance to said separate loop storage means; and
   means responsive to said capstan being stopped for applying said signal as a corrective signal to said reel servomechanism.

3. The combination of claim 2 wherein each reel servomechanism includes:
   a rotor connected to a pulley turned by said tape whenever said tape moves between said reel and tape loop storage means,
   a stator having a primary winding and a secondary winding,
   a source of high frequency AC excitation applied to said primary winding, and
   a rectifier connected to said secondary winding.

4. The combination of claim 3 wherein each reel servomechanism includes means for producing a signal proportional to tape velocity between a different one of said reels and separate loop storage means, said tape-velocity signal means comprising means connected to said secondary winding for discriminating a signal induced by said excitation in said secondary winding proportional to tape velocity over said pulley.

5. In a tape transport system having a supply reel, a take-up reel, and means for driving tape past a work station as tape is transferred from said supply reel to said take-up reel, said system further having means for storing loops of tape between each of said reels and said tape driving means, a separate combination for each reel and loop storing means comprising:
   a servomechanism for driving said reel in the requisite direction to supply or take up as it is driven by said driving means,
   means between said reel and said loop storing means for sensing tape velocity and applying a signal proportional to tape velocity to said servomechanism as a stabilizing feedback signal while said tape is being driven,
   means between said reel and said loop storing means for sensing any change in tape position therebetween, and generating a corrective signal proportional to any change, and
   means responsive to said tape driving means being idle for applying said signal proportional to change in tape position as a corrective signal to said reel servomechanism.

6. The combination of claim 5 wherein said tape position sensing means is comprised of an angular position sensor having a rotor connected to a pulley turned by said tape whenever said tape moves between said reel and loop storing means and a stator having a primary winding and a secondary winding, a source of high frequency AC excitation applied to said primary winding to induce a signal into said secondary winding, said rotor being of a form that will amplitude modulate the signal induced in said secondary as a function of its angular position.

7. The combination of claim 6 wherein said means for producing said signal proportional to tape velocity is comprised of means connected to said secondary winding for discriminating a signal induced by said excitation in said secondary winding proportional to tape velocity over said pulley.

8. The combination of claim 5 wherein:
   said tape velocity sensing means is comprised of a tachometer having a metal cup rotor connected to a pulley turned by said tape whenever said tape moves between said reel and loop storing means, and a stator having a primary winding and a secondary winding, a source of high frequency AC excitation applied to said primary winding, means for discriminating a signal induced by said excitation in said secondary winding proportional to tape velocity over said pulley, and said tape position sensing means is comprised of said tachometer and means for rectifying a signal induced in said secondary winding by said excitation to produce said corrective signal.

9. In a tape transport system having a capstan and servomechanism for velocity control of tape across a work station, separate reels and servomechanisms for tape supply and take-up control, and a separate tape loop between each reel and said capstan, a separate combination for each reel and tape loop comprising:

means between said reel and tape loop for sensing change in tape position and for applying a corrective feedback signal proportional to said change to said reel servomechanism to stabilize said reel servomechanism while said capstan is stopped, means for providing a feedback signal for said capstan servomechanism that is proportional to capstan velocity, separate means responsive to said capstan velocity feedback signal for generating separate reference signals proportional to the velocity of tape past said capstan, one reference signal for each reel servomechanism, separate means responsive to separate ones of said reference signals for generating ramp signals which increase or decrease at a controlled rate when capstan velocity is changed, and separate means for adding said ramp signals to separate ones of said reel servomechanisms for controlled acceleration and deceleration of said reels.

10. The combination of claim 9 wherein said means for applying said corrective feedback signal proportional to change in position comprises:

a rotor connected to a pulley turned by said tape whenever said tape moves between said reel and tape loop storage means, a stator having a primary winding and a secondary winding, a source of high frequency AC excitation applied to said primary winding, and a rectifier connected to said secondary winding.

11. The combination of claim 10 wherein each reel servomechanism includes means for producing a signal proportional to tape velocity between a different one of said reels and separate loop storage means, said tape-velocity signal means comprising means connected to said secondary winding for discriminating a signal induced by said excitation in said secondary winding proportional to tape velocity over said pulley.

12. The combination of claim 9 including:

separate means for sensing extent of tape in said separate tape loops, and separate means for controlling a factor of proportionality of respective reference signals in said reference generators in accordance with the extent of tape in respective tape loops.

13. In a tape transport system having a capstan and servomechanism for velocity control of tape across a work station and separate reels and servomechanisms for tape supply and take-up control, the combination comprising:

means for providing a feedback signal for said capstan servomechanism that is proportional to capstan velocity, separate means responsive to said capstan velocity feedback signal for generating separate reference signals proportional to the velocity of tape past said capstan to provide one reference signal for each reel servomechanism, separate means responsive to separate ones of said reference signals for generating ramp signals which increase or decrease at a controlled rate when capstan velocity is changed, and separate means for adding said ramp signals to separate ones of said reel servomechanisms for controlled acceleration and deceleration of said reels.

14. The combination of claim 13 including:

separate means for storing loops of tape between each reel and said capstan, separate means for sensing the extent of tape stored by each of said loop storing means, and separate means for controlling a factor of proportionality of said reference signals in said reference generators for respective ones of said reel servomechanisms.

* * * * *